US011756585B2

(12) United States Patent
Davis

(10) Patent No.: US 11,756,585 B2
(45) Date of Patent: Sep. 12, 2023

(54) INTERACTIVE PRESENTATION OF VIDEO CONTENT AND ASSOCIATED INFORMATION

(71) Applicant: Snap Inc., Santa Monica, CA (US)

(72) Inventor: Brent Davis, Venice, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 16/998,759

(22) Filed: Aug. 20, 2020

(65) Prior Publication Data

US 2020/0381020 A1    Dec. 3, 2020

Related U.S. Application Data

(63) Continuation of application No. 16/256,549, filed on Jan. 24, 2019, now Pat. No. 10,783,927, which is a
(Continued)

(51) Int. Cl.
| | |
|---|---|
| *G11B 27/036* | (2006.01) |
| *G11B 27/28* | (2006.01) |
| *G06F 3/0488* | (2022.01) |
| *G11B 27/34* | (2006.01) |
| *H04N 5/91* | (2006.01) |

(Continued)

(52) U.S. Cl.
CPC .......... *G11B 27/036* (2013.01); *G06F 3/0488* (2013.01); *G06F 3/04845* (2013.01); *G06Q 30/0277* (2013.01); *G11B 27/28* (2013.01); *G11B 27/34* (2013.01); *H04N 5/91* (2013.01); *H04N 5/92* (2013.01); *G06F 3/0483* (2013.01)

(58) Field of Classification Search
CPC ....... G11B 27/036; G11B 27/28; G11B 27/34; G06F 3/04845; G06F 3/0488; H04N 5/92
See application file for complete search history.

(56) References Cited

U.S. PATENT DOCUMENTS

| | | |
|---|---|---|
| 6,038,295 A | 3/2000 | Maltes |
| 6,980,909 B2 | 12/2005 | Root et al. |

(Continued)

FOREIGN PATENT DOCUMENTS

CA    2887596 A1    7/2015

OTHER PUBLICATIONS

"U.S. Appl. No. 15/195,719, Final Office Action dated Jun. 29, 2018", 13 pgs.
(Continued)

*Primary Examiner* — Mishawn N. Hunter
(74) *Attorney, Agent, or Firm* — SCHWEGMAN LUNDBERG & WOESSNER, P.A.

(57) ABSTRACT

A system is provided that presents video content on an electronic device such that, when a user swipes to dismiss the video content, non-video summary information or contextual material about the video content is automatically displayed in place of the video content. The non-video summary information is presented on a summary card dragged on-screen responsive to user swipe input. If, for example, the user swipes to dismiss a video advertisement before an informational payload of the video advertisement has been delivered, the informational payload can automatically be displayed in text format on a summary card dragged by the user in replacement of the dismissed video advertisement.

20 Claims, 17 Drawing Sheets

Related U.S. Application Data continuation of application No. 15/195,719, filed on Jun. 28, 2016, now Pat. No. 10,229,717.

(60) Provisional application No. 62/196,453, filed on Jul. 24, 2015.

(51) Int. Cl.
| | |
|---|---|
| *G06Q 30/0241* | (2023.01) |
| *G06F 3/04845* | (2022.01) |
| *H04N 5/92* | (2006.01) |
| *G06F 3/0483* | (2013.01) |

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 7,773,855 B1 * | 8/2010 | Markman ......... H04N 21/4325 386/241 |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 10,229,717 B1 | 3/2019 | Davis |
| 10,783,927 B1 | 9/2020 | Davis |
| 2006/0188217 A1 | 8/2006 | Iwabuchi et al. |
| 2010/0027966 A1 | 2/2010 | Harrang et al. |
| 2010/0295805 A1 | 11/2010 | Shin |
| 2011/0072382 A1 | 3/2011 | Caldwell et al. |
| 2011/0202598 A1 | 8/2011 | Evans et al. |
| 2012/0144424 A1 | 6/2012 | Ganesan et al. |
| 2012/0209924 A1 | 8/2012 | Evans et al. |
| 2012/0304111 A1 | 11/2012 | Queru |
| 2015/0058754 A1 | 2/2015 | Rauh |
| 2015/0245103 A1 | 8/2015 | Conte |
| 2015/0256763 A1 | 9/2015 | Niemi |
| 2015/0358584 A1 | 12/2015 | Mattson |
| 2016/0098941 A1 | 4/2016 | Kerluke |

OTHER PUBLICATIONS

"U.S. Appl. No. 15/195,719, Non Final Office Action dated Jan. 11, 2018", 12 pgs.

"U.S. Appl. No. 15/195,719, Notice of Allowance dated Oct. 24, 2018", 7 pgs.

"U.S. Appl. No. 15/195,719, Response Filed May 11, 2018 to Non Final Office Action dated Jan. 11, 2018".

"U.S. Appl. No. 15/195,719, Response filed Oct. 1, 2018 to Final Office Action dated Jun. 29, 2018", 13 pgs.

"U.S. Appl. No. 16/256,549, 312 Amendment filed Aug. 13, 2020", 7 pgs.

"U.S. Appl. No. 16/256,549, Non Final Office Action dated Oct. 7, 2019", 8 pgs.

"U.S. Appl. No. 16/256,549, Notice of Allowance dated May 15, 2020", 5 pgs.

"U.S. Appl. No. 16/256,549, Response filed Feb. 7, 2020 to Non Final Office Action dated Oct. 7, 2019", 12 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

"U.S. Appl. No. 16/256,549, PTO Response to Rule 312 Communication dated Aug. 24, 20", 2 pgs.

\* cited by examiner

INTERACTIVE PRESENTATION OF VIDEO CONTENT AND ASSOCIATED INFORMATION

CLAIM OF PRIORITY

This application is a continuation of and claims the benefit of priority to U.S. patent application Ser. No. 16/256,549, filed on Jan. 24, 2019, which is a continuation of and claims the benefit of priority to U.S. patent application Ser. No. 15/195,719, filed on Jun. 28, 2016, which claims the benefit of priority to U.S. Provisional Patent Application Ser. No. 62/196,453, filed on Jul. 24, 2015, each of which is hereby incorporated by reference herein in its their entireties.

BACKGROUND

The presentation of information to users by means of video content on electronic devices has become increasingly prevalent. Such video content includes not only video clips, movies, or the like explicitly selected by the user for viewing on the electronic device, but also includes promotional content, such as autoplay video advertisements.

An informational or promotional payload of such video content is often not readily available when the video content is presented, while some video content does not deliver its informational or promotional payload immediately but does so only some way into playback of the content. Users often, however, dismiss the video playback before its promotional payload has been completed or before the video playback has progressed sufficiently to present particular targeted information to the user.

BRIEF DESCRIPTION OF THE DRAWINGS

Some aspects of the disclosure are illustrated in the appended drawings. Note that the appended drawings illustrate example embodiments of the present disclosure and cannot be considered as limiting the scope of the disclosure.

Figure 1A:
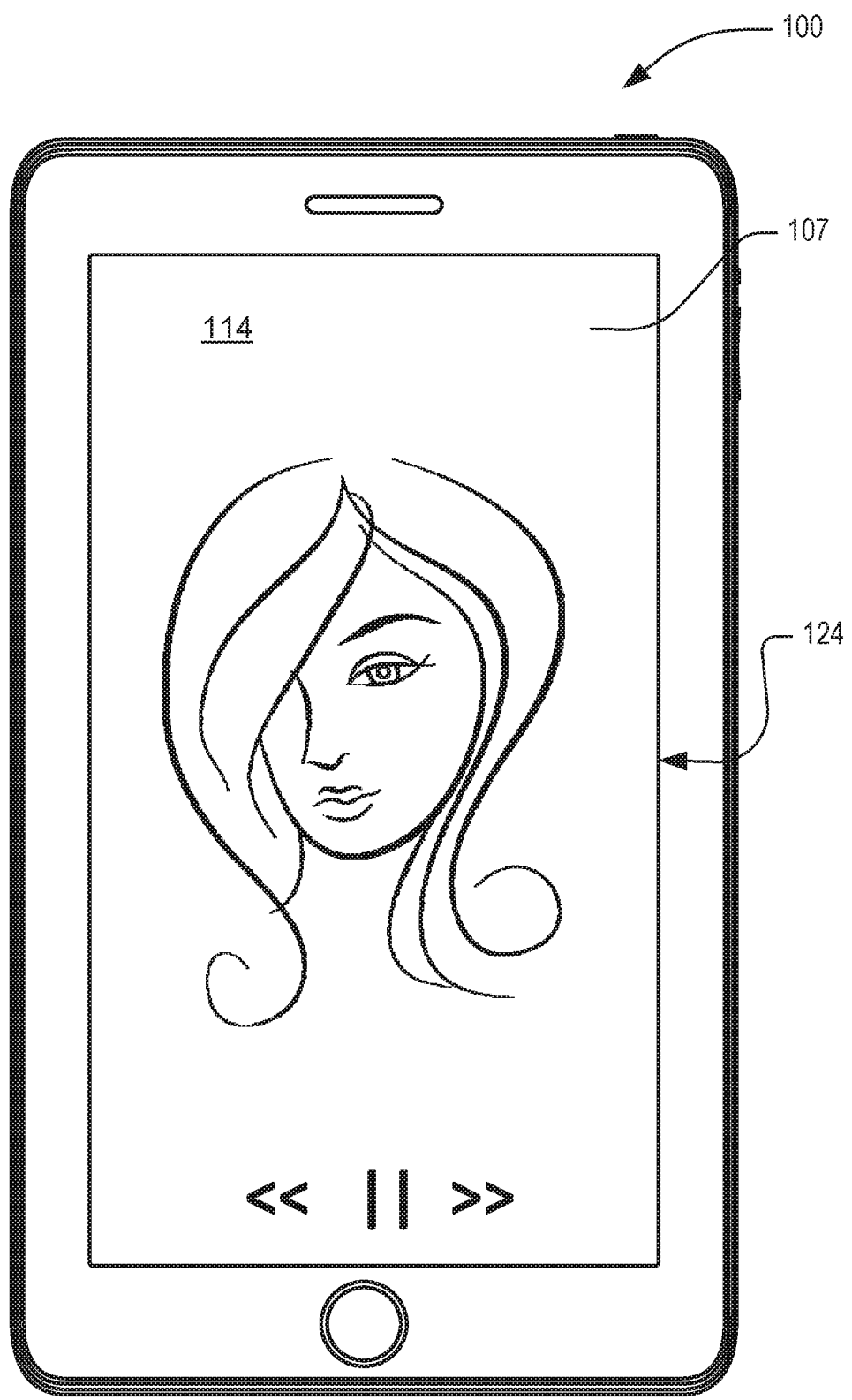
FIGS. 1A-1E provide respective schematic views of a mobile client device displaying video content and corresponding semantic summary information according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

One aspect of the disclosure provides for a method and system for presenting video content via an electronic device. The method comprises, in response to detecting user input to dismiss the video content, displaying in replacement of the video content non-video summary information or contextual material that pertains semantically to subject matter of the replaced video content.

In some embodiments, the video content comprises a video advertisement. In such cases, the summary information may comprise graphic display of a brand, product, event, and/or offer to which the subject matter of the media content pertains. In some embodiments, the video advertisement and the summary information may comprise a video version and a print version of a particular advertisement. Differently defined, the video content and the corresponding summary information may be a video advertisement and a print advertisement (or other non-video advertisement) forming part of a common advertising campaign. Note that the terms "print advertisement" or "print version" as used herein mean a still image that is suitable for playback in a print medium, and these terms include non-print playback of such an image on an electronic display screen. The non-video advertisement or print advertisement can comprise a composite visual advertisement comprising text information together with photographic, graphics, or other pictorial images.

In some embodiments, the video content comprises entertainment and/or informational material that is non-promotional in nature (i.e. not being a video advertisement). In such embodiments, the corresponding summary information may display title and/or bibliographic information about the video content. In one example embodiment, the video content comprises educational video material or video entertainment material such as a movie or an episode of a television series, with the summary information comprising a title card or title image. Such a title card or title information may comprise, for example, the relevant movie title or series and episode title and/or number, as the case may be.

In some embodiments, the user input to dismiss the video content may comprise a dismissal gesture performed via a user input mechanism provided by the user device. In some embodiments, the dismissal gesture comprises a swiping gesture in which the media content is grabbed (e.g., by a finger press on a touchscreen or a cursor click and hold via mouse input) and dragged or swiped in a specific direction, to dismiss the video content. In such embodiments, the video content may automatically be replaced with a summary image displaying the corresponding summary information on initiation of the swiping or dragging motion.

One instance of such an embodiment can be seen with reference to the examples described with reference to FIGS. 1 and 5A. A user viewing an autoplay video advertisement on a mobile electronic device (see FIG. 1A) may, for example, decide to dismiss the video advertisement prematurely—e.g., before an advertising payload has been communicated to the user—to scroll on to a next item in a series of media items. When the user taps on the touchscreen display of the device and starts dragging the video advertisement sideways in order to dismiss it (FIG. 1B), the video advertisement is instantaneously replaced by summary information in the form of a print version of the video advertisement. In this manner, the user is apprised or informed of at least some aspects of the informational payload of the video advertisement, even though viewing of the advertisement has ceased prematurely.

In some embodiments, on-screen behavior of a substitutional summary image that provides the summary information is consistent with a way in which the substituted video content would have behaved responsive to user input, had it not been replaced by the substitutional summary image. For example, in the example embodiment of FIG. 1C, a summary image or title card displayed in place of the video advertisement during a dismissal swipe moves sideways together with the user's finger or cursor as it swipes sideways.

In some embodiments, abortion or cessation of the dismissal gesture before completing dismissal of the video advertisement automatically results in resumption of playback of the video content. Returning again to the example embodiment of FIGS. 1A-1E, it will be seen that the above feature is manifested in these embodiments by providing for the summary image (e.g., the print version of the video advertisement) in turn to be replaced—if the dismissal swipe is not completed—by the video advertisement, which continues playback from its last viewed location (FIG. 1E). When the user, for example, starts swiping the video advertisement sideways in order to dismiss it, but then takes note of the summary information of the print version by which the video advertisement has been replaced, the user may in some instances decide not to dismiss the video advertisement. To do so, the user in this example merely releases the on-screen object being swiped (thus ceasing the dismissal gesture), in response to which the swiped title card is bounced back to full-screen configuration and is replaced by the interrupted video content, which resumes playback in full-screen mode.

In some embodiments, the dismissal gesture may comprise a tapping or clicking gesture rather than a swiping motion as discussed above. In some such embodiments, display of the summary information comprises display of a substitutional summary image for the duration of the tap or click input. In some embodiments, e.g., receipt of a tap-and-hold input (or a click-and-hold) automatically results in display of the summary image for at least the duration of the tap-and-hold input.

In some embodiments, display of the summary image is ceased immediately upon release of the tap- or click input. In some such embodiments, release of the tap-or click input causes substantially immediate dismissal of the video content and initiation of presentation of another media item. In other embodiments, summary information may be displayed automatically in response to input other than a dismissal commands. In some embodiments, for example, a dismissal command may comprise a swipe input, with a tap-and-hold or click-and-hold input automatically resulting in display of the substitutional summary information while the tap or click input is held, and release of the tap or click input resulting in resumed playback of the original video content.

In some embodiments, receipt of a tap input or click input automatically results in automated display of the summary image for a predetermined set interval. One example of such an embodiment is described below with reference to FIGS. 2A-2E and FIG. 5B. In some such embodiments, the summary image automatically fades out or transitions automatically after expiry of the set interval (e.g., FIG. 2C). In some such auto-transition embodiments, the user can select to resume playback of the video content instead of dismissing it by providing another tap or click input during the set interval while the summary image is displayed on-screen instead of the video content (e.g., FIG. 2D). The set interval may be 0.5-2 seconds. In some embodiments the interval may be approximately one second.

Automated display of summary information in the form of, for example, a synoptic image, title card, or an abbreviated advertisement upon the user-initiated dismissal of video content on the display of an electronic device, as described, may provide various benefits when employed with many different types of electronic devices, including both mobile and non-mobile devices. The method is particularly beneficial when used in conjunction with full screen displays, and/or in instances where available screen space is limited. Mobile phones and other mobile electronic devices, for example, often have relatively small screens on which the provision of a text overlay over video content during or before dismissal may be insufficiently efficacious in drawing user attention and/or in conveying information to the user. These difficulties are ameliorated by the described methods and systems, in that the replacement summary image or replacement abbreviated advertisement can be designed to have sufficient visual impact to facilitate virtually instantaneous user recognition and consumption.

Another advantage of the described methods and systems is that they allow for increased presentation of information to the user with minimal increase in user irritation or increased user input. If, for example, the user does not wish to continue viewing video content, the dismissal gesture or input is simply completed, in which case the information of the summary image is conveyed to the user without requiring from the user any input additional to that which would have been provided without display of the summary image during dismissal of the video content.

Yet a further benefit of use of these methods and/or systems in conjunction with video advertisement is that it allows for effective delivery of the information payload of an advertisement even if the user does not want to watch video advertisement for long enough to receive this information from the video advertisement. Yet further, user attention is typically fixed on the device display during the provision of input to dismiss the relevant video content, thus providing for increased likelihood of effectively conveying the relevant information to the user.

More detailed example embodiments will now be described briefly with respect to the attached drawings. In FIGS. 1A-1E and 2A-2E of the drawings, reference numeral 100 generally indicates a mobile electronic device in the form of a mobile smartphone that is specially configured (e.g., by having one or more permanently configured video playback controllers or by having one or more temporarily configured video playback controllers provided by software executed by a dynamically reconfigurable computer processor) to provide a transitional display of summary information about the video content during dismissal of the video content by a user. FIG. 5A and FIG. 5B show respective flow charts 500 and 501 of methods corresponding to two different example embodiments. The example method of FIG. 5A will first be described with reference to FIGS. 1A-1E, after which the example method of FIG. 5B will be described with reference to FIGS. 2A-2E.

Figure 5A:
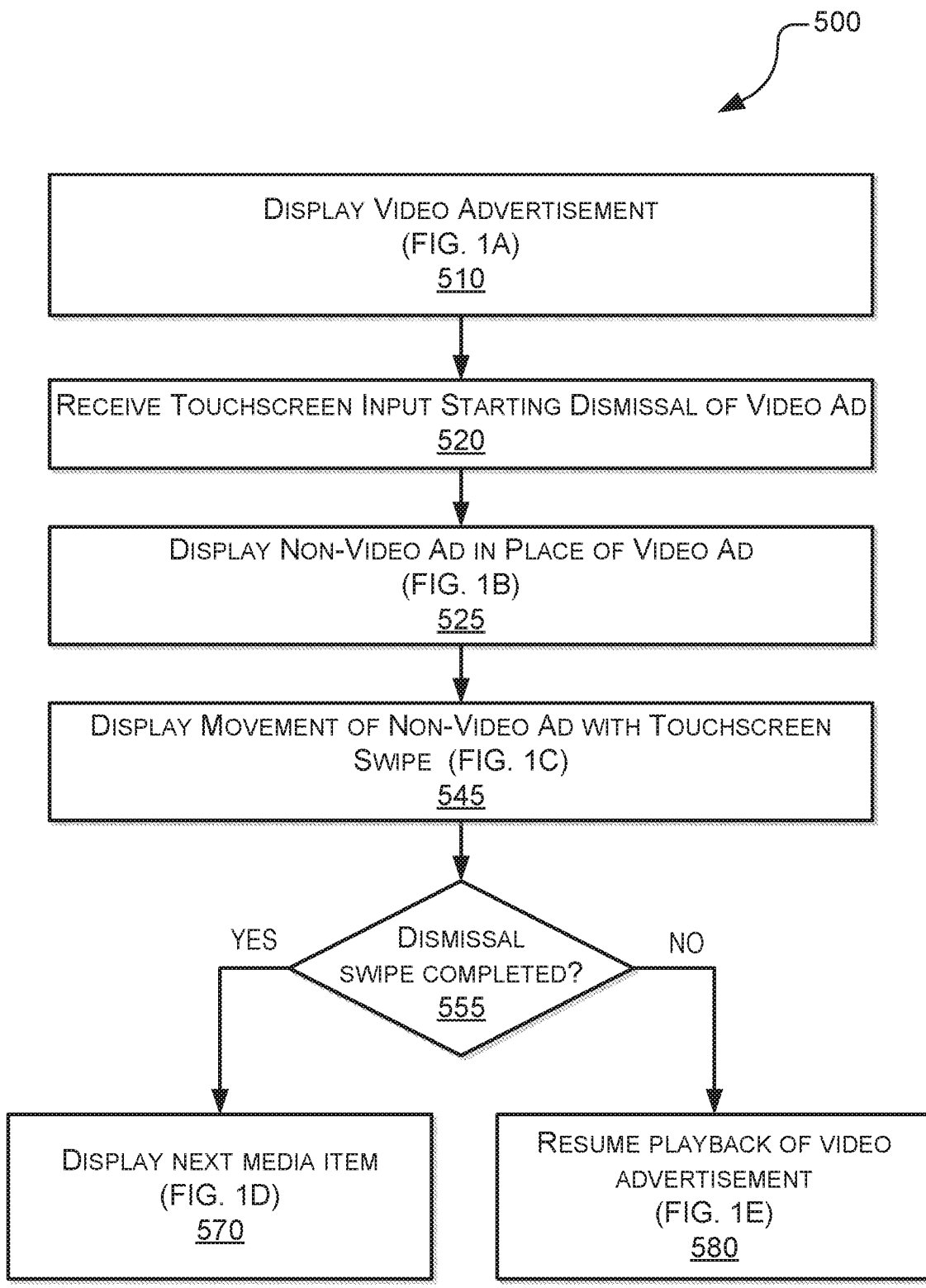
FIG. 5A is a schematic flow diagram of a video content presentation method corresponding to the example embodiments of FIGS. 1A-1E.
Figure 5B:
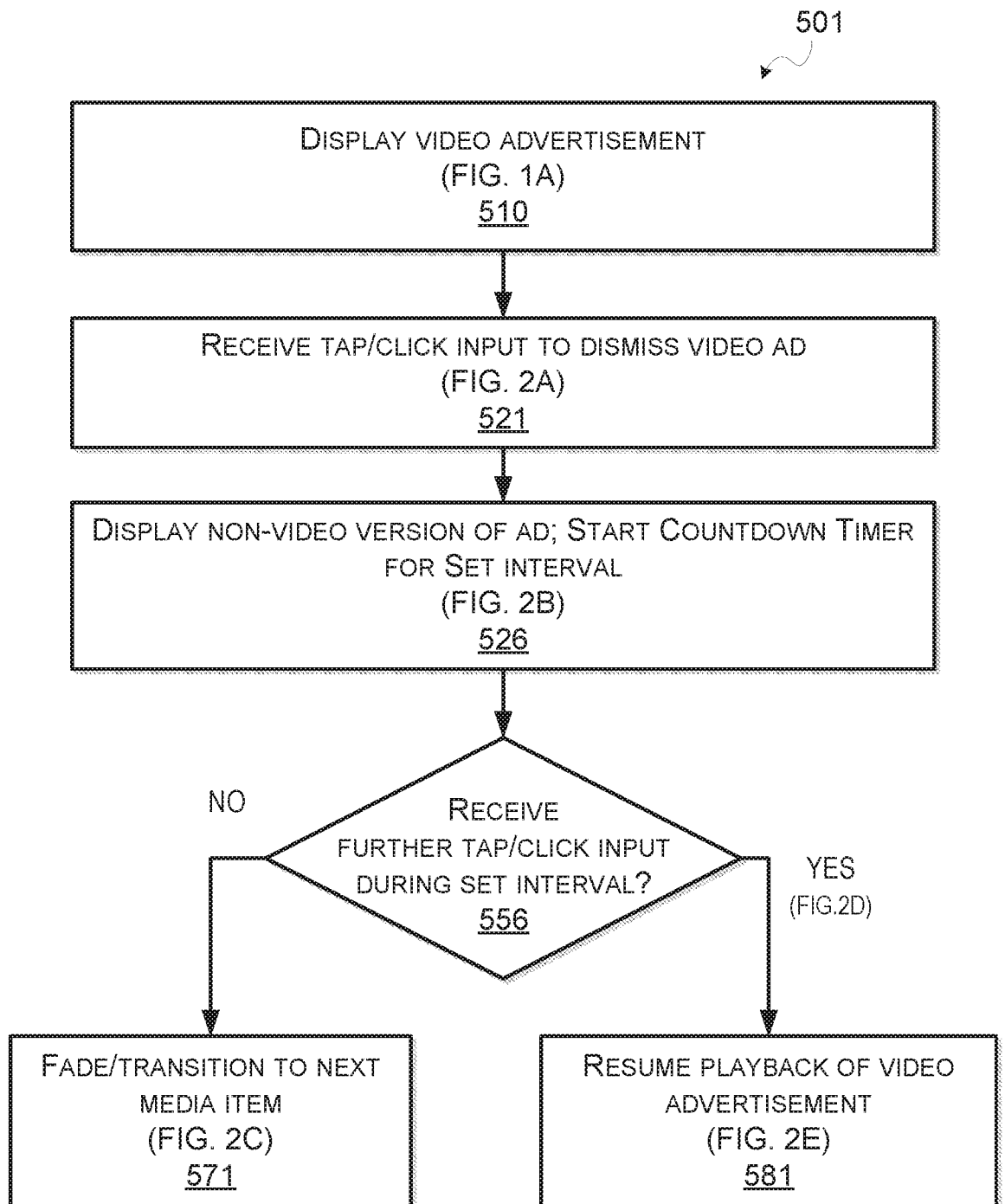
FIG. 5B is a schematic flow diagram of a video content presentation method corresponding to the example embodiments of FIGS. 2A-2E.

At operation 510 in the flowchart 500 of FIG. 5A, video content in the example form of a video advertisement 114 is played on a screen 107 of the mobile phone 100 in full-screen format (see FIG. 1A). In this example embodiment, the video advertisement 114 is a movie trailer. In other embodiments, the video advertisement 114 can be directed to promoting a particular product, service, offer, opportunity, or the like.

If a user viewing the video advertisement 114 wishes to stop the playing of the video and dismiss it, the user can in this example embodiment provide a dismissal gesture indicating that the video advertisement 114 is to be dismissed. In this example embodiment, the screen 107 is a touchscreen receptive to haptic input directly on the screen 107 on which the video is displayed. In other embodiments, such as in instances where the video advertisement 114 is displayed on screen that does not have touchscreen functionality, the dismissal input may be provided in a manner different from the touch input described below with reference to the example embodiment of FIG. 1A.

In this example embodiment, the dismissal gesture provided by touch input on the screen 107 comprises dragging or swiping the video advertisement 114 to a side edge of the screen 107. Here, the video advertisement 114 is dismissed by swiping towards a right side edge 124 of the screen 107. It will be appreciated that such dismissal of the video advertisement 114 may in many instances occur shortly after commencement of the video playback, before the promotional content or payload of the video advertisement 114 has been conveyed to the user. Thus, for example, the particular video advertisement 114 may be one and a half minutes in total length and may provide information about the name of the particular movie, the names of the lead actors and/or director, and the release date of the movie only 30 seconds into playback of the video advertisement 114. This information provides, in this example, the promotional or informational payload of the video advertisement 114. If the video advertisement 114 is skipped before the video playback has progressed for 30 seconds, the payload of the advertisement is not delivered, and the user is not exposed to the information targeted for delivery by the video advertisement 114.

Figure 1B:
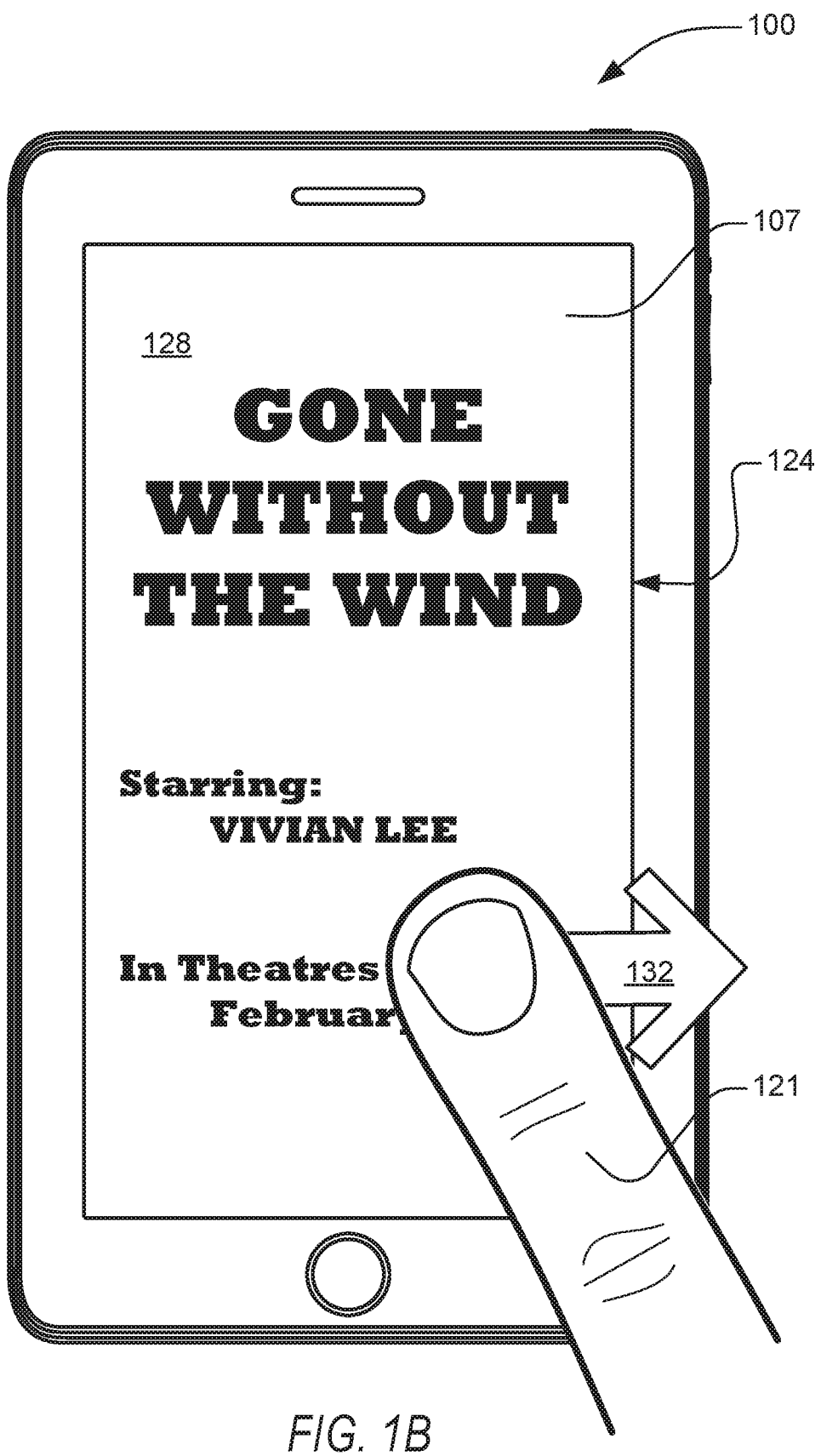

When, at operation 520 (FIG. 5A), touchscreen input that dismisses the video advertisement 114 (or, in this example embodiment, starts dismissal of the video advertisement) is received, non-video summary information about the video advertisement 114 is displayed on the screen 107 in full-screen format instead of the video advertisement 114 (operation 525, FIG. 5A). In this example embodiment, commencement of the dismissal gesture is detected when a rightward swiping motion via the user's finger 121 in contact with the screen 107 is started (as indicated schematically by arrow 132 in FIG. 1B). As can be seen in FIG. 1B, the summary information or summary image in this example embodiment comprises a non-video advertisement 128 about the same movie promoted by video advertisement 114 which it replaces. The non-video advertisement 128 consists of text information and pictures/graphics that provide an informational payload of the interrupted video advertisement 114. In this example, the informational or promotional payload comprises a movie title, the name of the headline actor, and the relevant opening date. A photographic image and/or tagline can also be included in this example summary information.

Figure 1C:
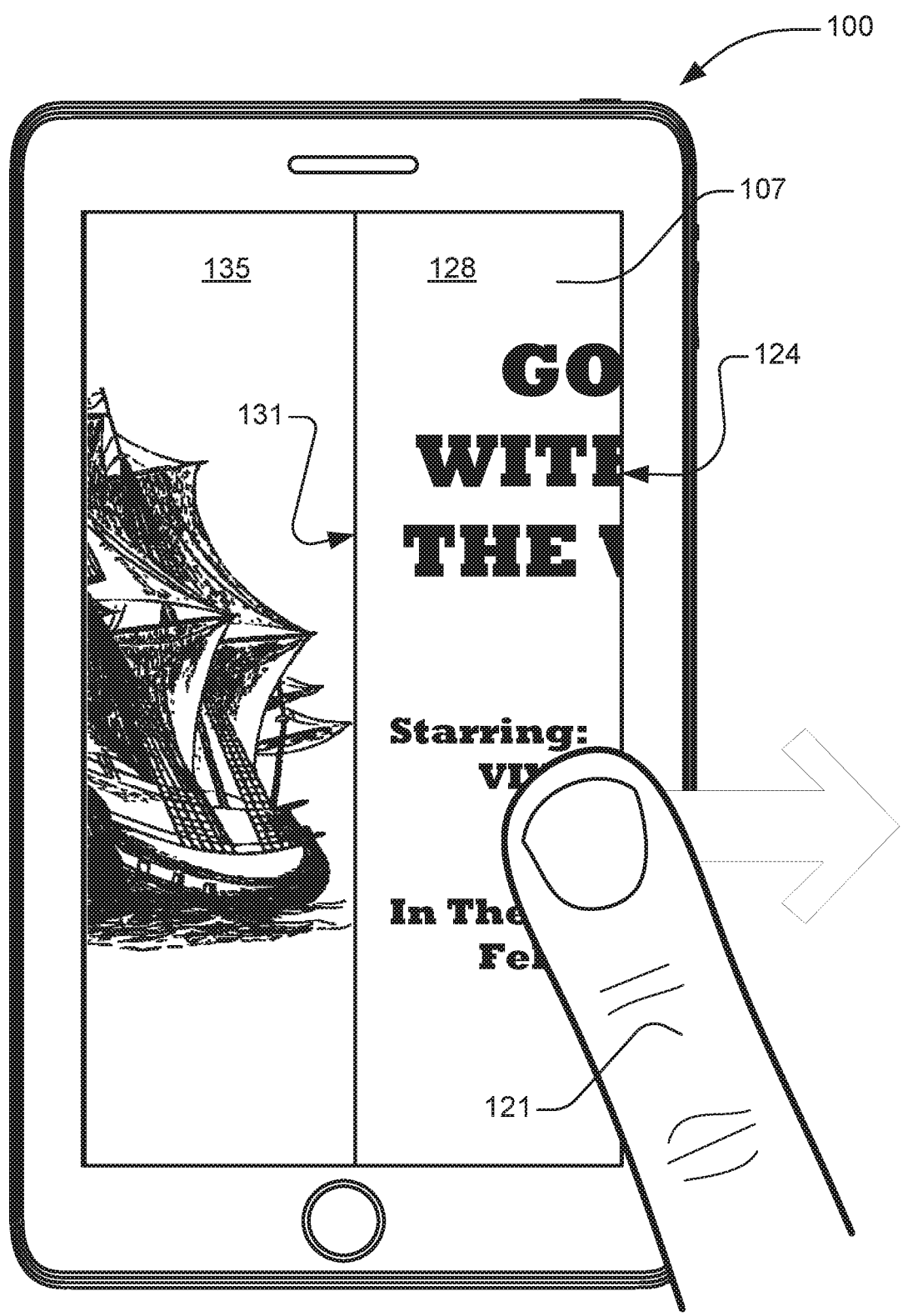

At operation 545 (FIG. 5A), the dismissal swipe is continued, with the user's finger 121 moving closer to the lateral right side edge 124 of the screen 107 (see FIG. 1C). During this swiping motion, full-screen display of the summary information may be replaced by display of the summary information in a user interface element that is movable on-screen responsive to continued user input. In the example embodiment of FIG. 1C, the movable user interface element is a title card within which the non-video advertisement 128 is displayed and which is moved sideways across the screen 107 together with movement of the user's finger 121. During swiping of the non-video advertisement 128, the full-screen display is thus in this example embodiment replaced by a split screen display having a vertical split line 131 that separates the screen between the dragged title card of the non-video advertisement 128 and a next media item 135 to be displaced after dismissal of the video advertisement 114.

If the user drags the non-video advertisement 128 all the way to the side edge 124 of the screen, the dismissal gesture is completed. The right side edge 124 is thus in this example a terminal position for the drag input. In this instance, this results in automatic playing of the next media item 135.

Figure 1D:
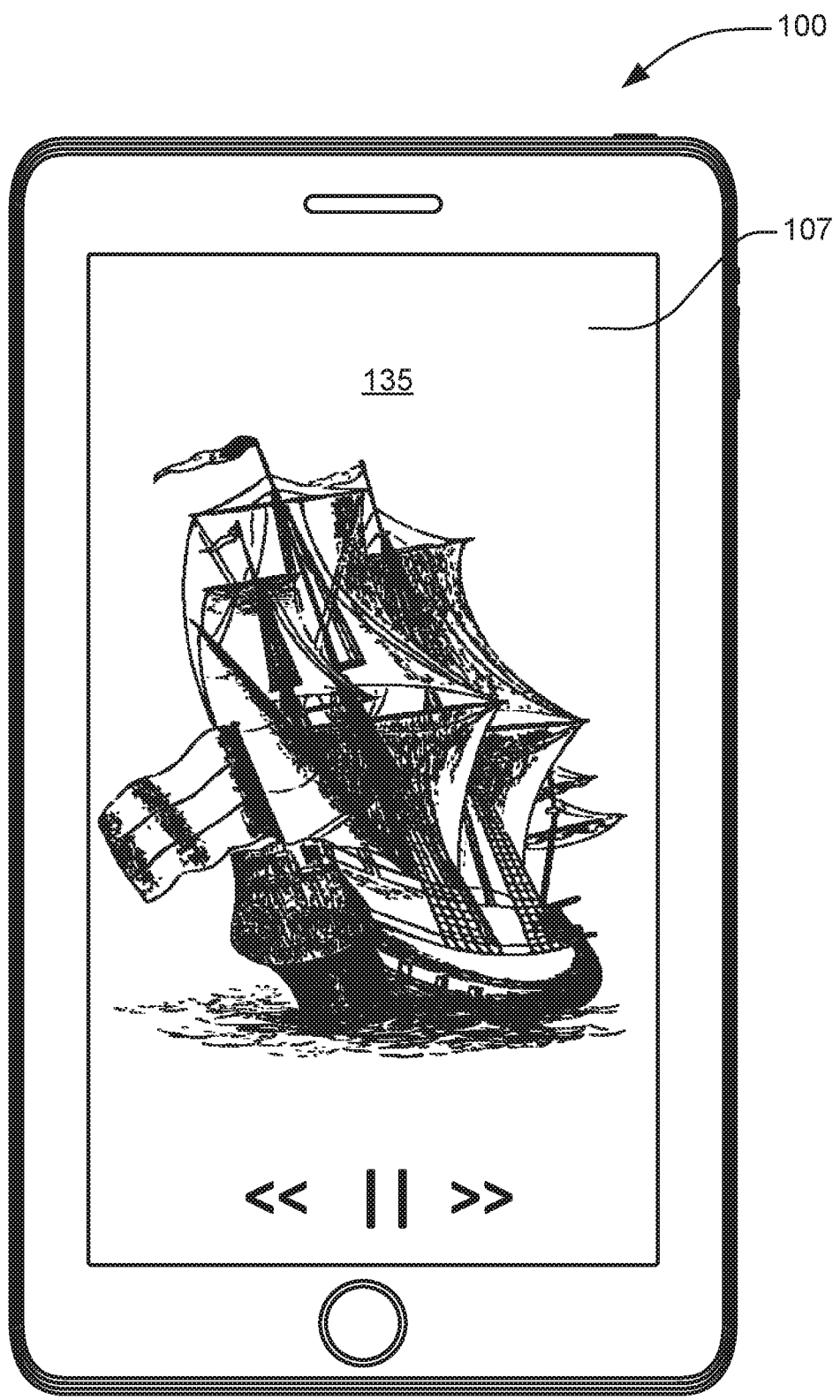
Figure 1E:
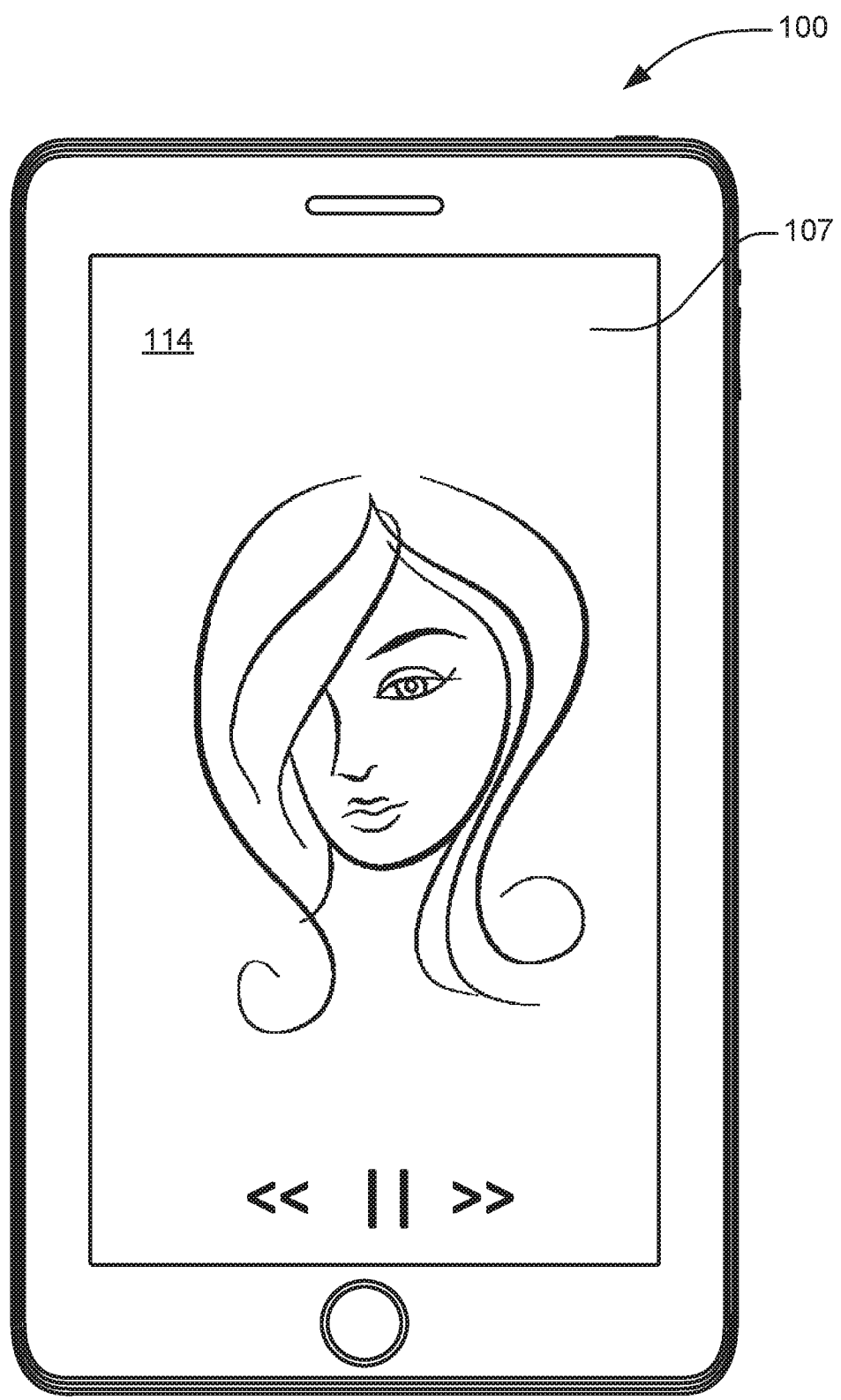

At operation 555, a video playback controller forming part of the mobile phone 100 automatically detects whether or not the dismissal swipe is completed. If so, the successive or next media item 135 in a series of media items is displayed on the screen 107 in full-screen mode (operation 570 in FIG. 5A; FIG. 1D). If the dismissal gesture is not completed, playback of the video advertisement 114 is recommenced at its last playback position (operation 580; FIG. 1E).

If the user thus, for example, starts to dismiss an autoplay video advertisement 114, but then notices the promotional summary information provided by the non-video advertisement 128 and decides to view the video advertisement 114 further, the user need only stop the swiping gesture short of its completion, in response to which the video advertisement jumps back to fullscreen mode and seamlessly resumes playback (FIG. 1E).

FIG. 5B shows a flowchart that schematically illustrates another example method 501 that is analogous to the above-described method 500 of FIG. 5A, with one distinction being that user input to dismiss video content (again shown in FIG. 2A in the example embodiment of a video advertisement 114) can be provided in a form different from the swiping gesture described with reference to FIG. 5A and FIGS. 1A-1E. In the following description with reference to FIG. 5B and FIGS. 2A-2E user input to dismiss currently played video content is in the form of a touchscreen tap instead of a dragging or swiping touchscreen gesture.

Figure 2A:
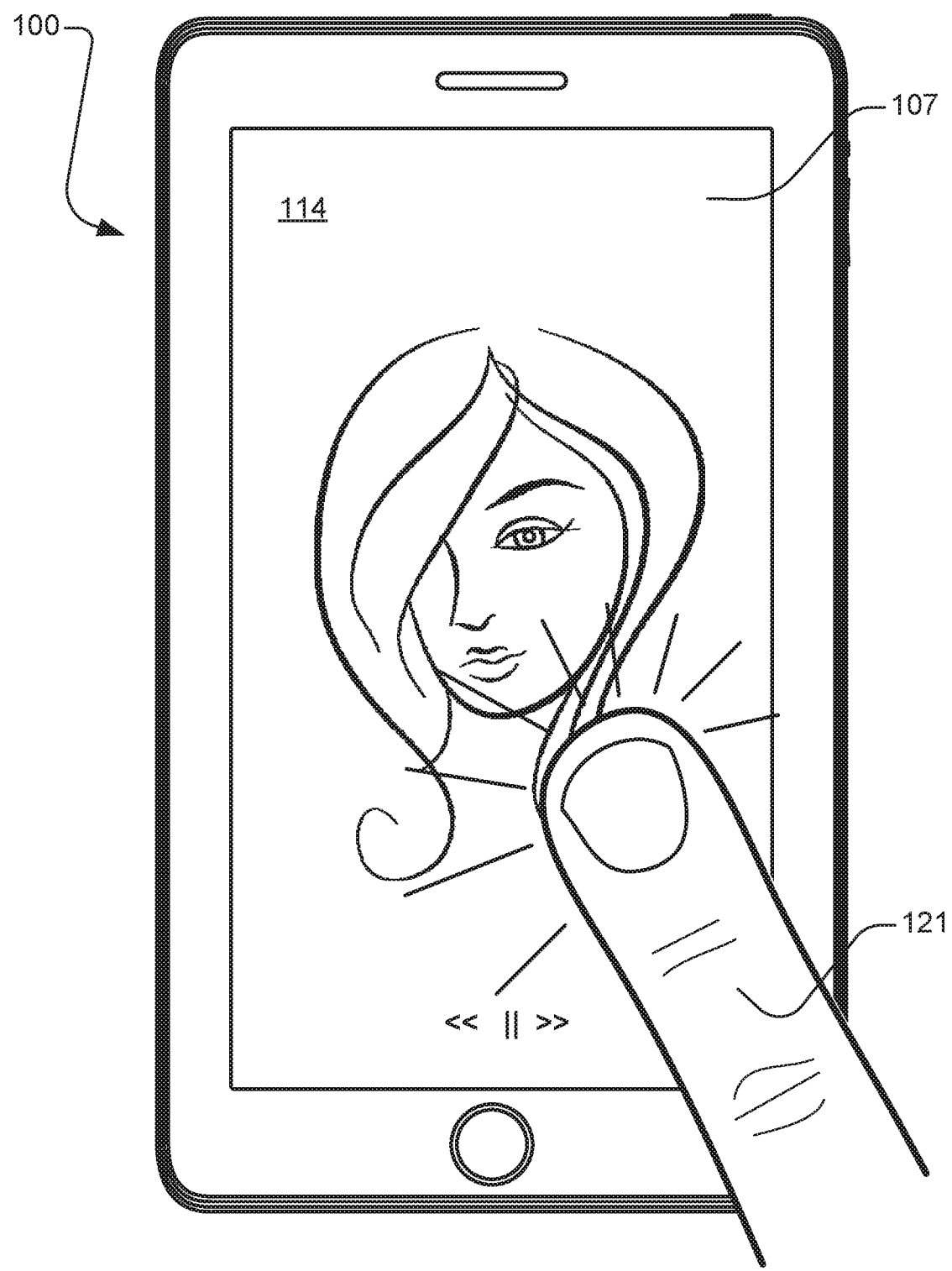
FIGS. 2A-2E provide respective schematic views of a mobile client device displaying video content and corresponding semantic summary information according to further example embodiments.
Figure 2B:
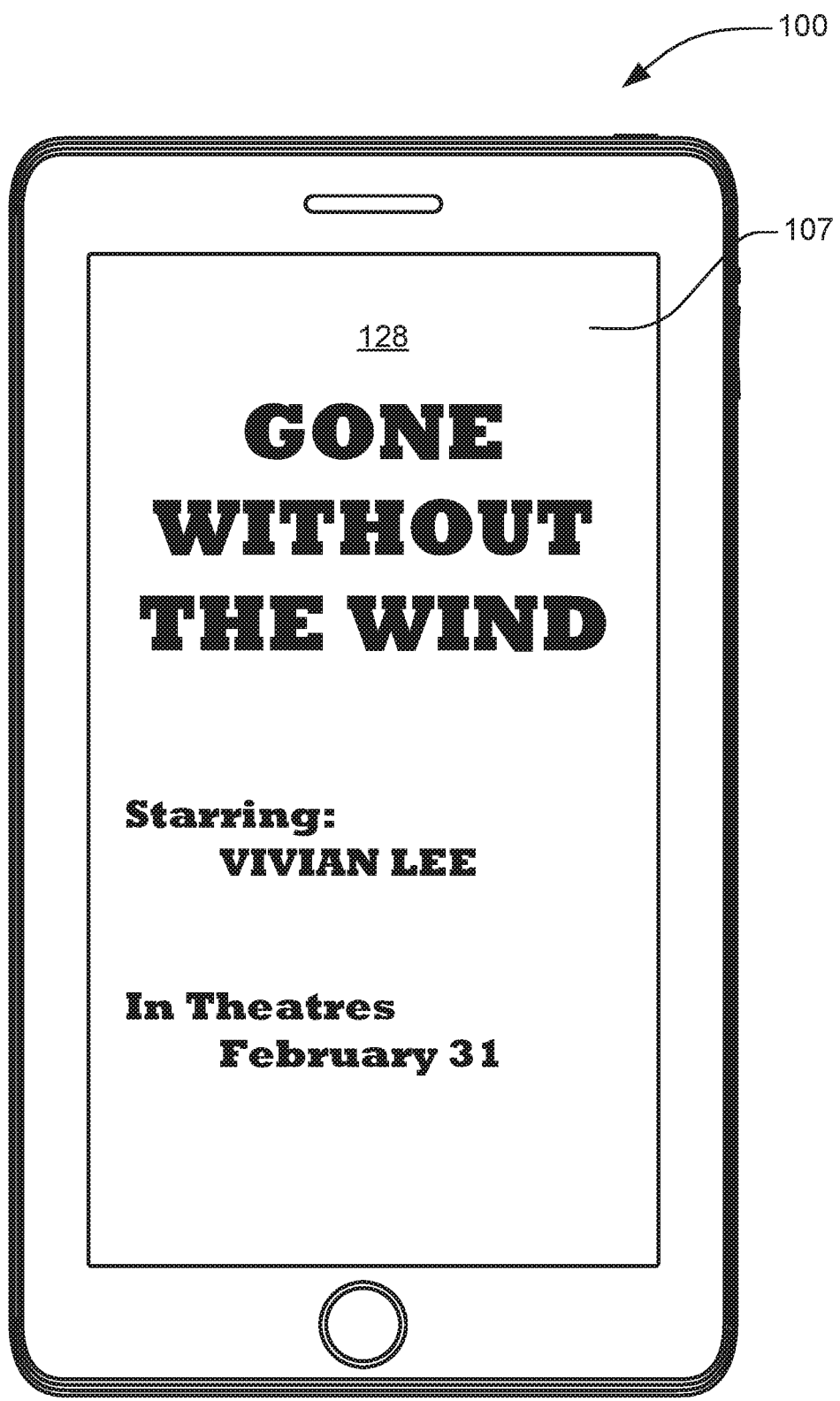

In response to tapping on the full-screen playback of the video advertisement 114 (operation 521 in FIG. 5B; corresponding to FIG. 2A), the non-video advertisement 128 in the form of a title card for the video advertisement 114 is automatically displayed on the screen 107 in full-screen mode in replacement of the video advertisement 114 (operation 526; FIG. 2B). Note that although the presently described example embodiments are with respect to display via a video playback application executing on a touchscreen-enabled mobile phone 100, the disclosed methods may in other example embodiments be performed using different platforms and user interfaces. The described functionalities may, for example, be provided on a desktop personal computer in which video content is presented to a user by being played in, for example, a browser interface on a display screen that is not touch-enabled. In such case, user input can be provided using a peripheral such as a mouse or a keyboard, with the dismissal command (and the subsequent optional resumption command) being a mouseclick on the played video, a mouseclick on an on-screen NEXT or SKIP soft button, a spacebar press, or the like.

Figure 2C:
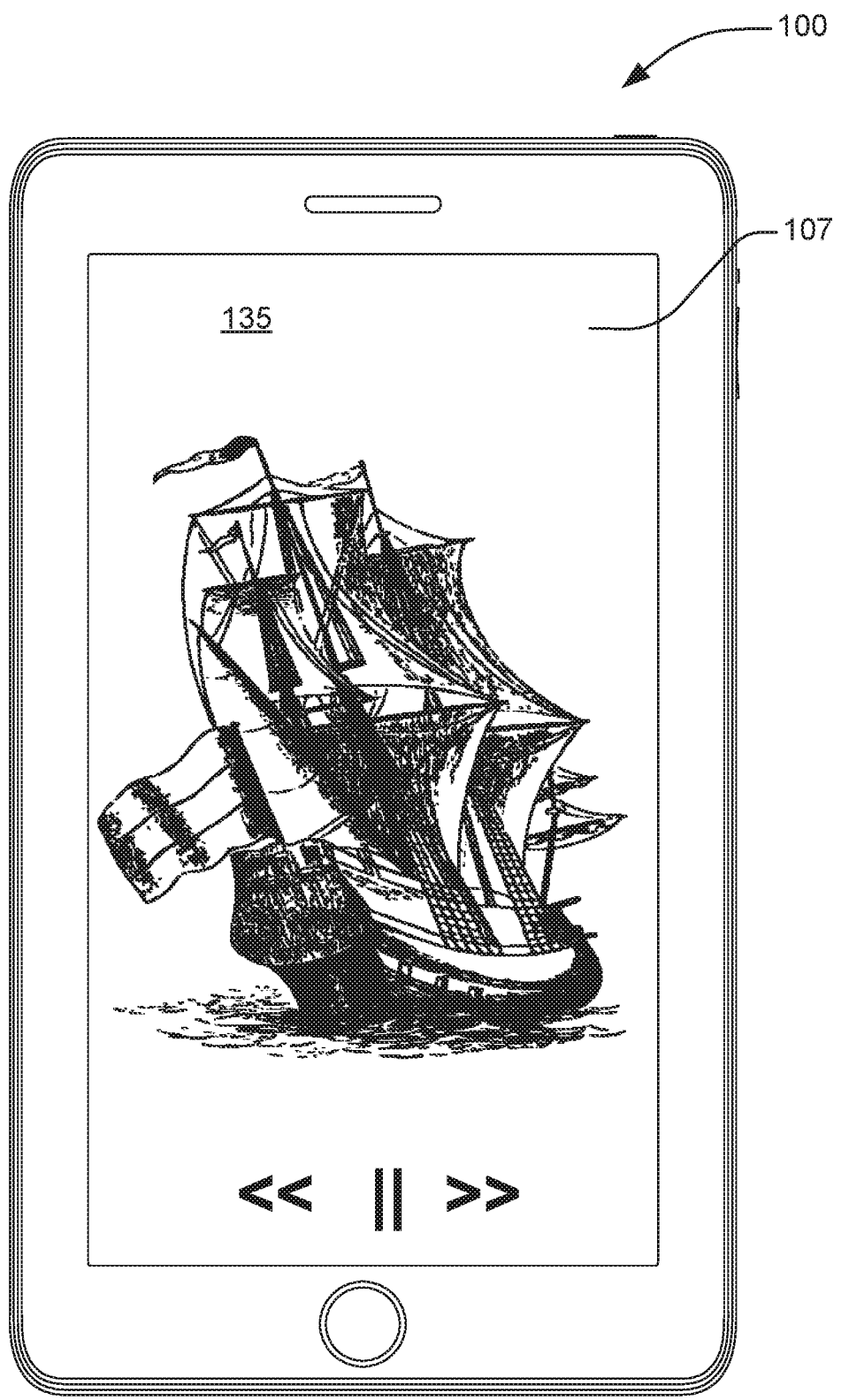
Figure 2D:
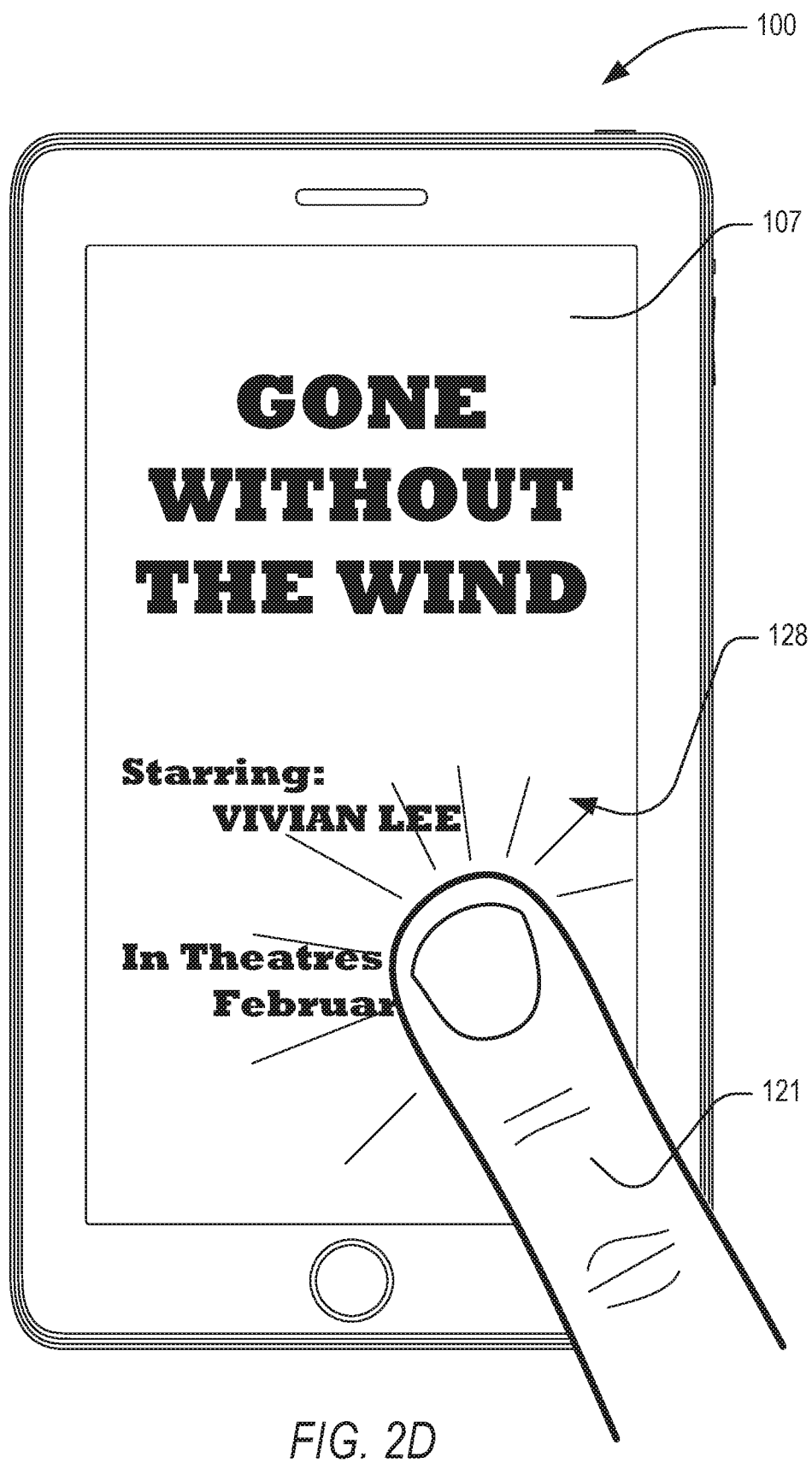

Display of the summary information in the form of the non-video advertisement 128 corresponding to the video advertisement 114 that is to be dismissed comprises, in this example embodiment, displaying the non-video advertisement 128 for at least a predetermined set interval, in this example being one second. If no further input is received during the set interval while the summary information is displayed (as determined in operation 556 of FIG. 5B), then the next media item 135 is automatically displayed in full-screen mode (operation 571; FIG. 2C).

In this example embodiment, display of the non-video advertisement 128 (at operation 526) immediately follows reception of the dismissal command (at operation 521). In other embodiments, however, one or more additional contextual images can be displayed before or after display of the non-video advertisement 128 (or, in other embodiments, display of corresponding informational material related to the replace video content). In one example, an isolated brand image (such as a brand logo and/or brand name) may be displayed as a transitional image between the video content (e.g., the video advertisement 114) and the associated informational material (e.g., the non-video advertisement 128). In another embodiment, such a brand or product page can instead or in addition be displayed after display of the non-video advertisement 128. Note that, in some embodiments, the summary information or informational material associated with a video may consist in totality of a brand or product page, as described. For example, if a video advertisement for, say, Walmart™ is dismissed by the user, an image with the company's logo on a solid blue background may be displayed for a brief period (e.g., a second or two), before the display transition to the next media item 135.

It will be seen that the summary information or informational payload provided by the non-video advertisement 128 is thus displayed as an ephemeral transitional image subsequent to premature user-dismissal of the video advertisement 114. When the user watches the video advertisement 114 to completion, however, no transitional image such as the non-video advertisement 128 is provided between the video advertisement 114 and the next media item 135.

If, in the example embodiment of FIG. 5B, the user wishes to resume viewing of the movie trailer 114 upon taking note of the summary information provided by the non-video advertisement 128, a further tap or click input is to be provided before expiry of the set interval during which the summary information 128 is displayed. The user may for example dismiss the autoplay movie trailer video advertisement 114 almost immediately or at least before the details of the promoted movie is given by playback of the video advertisement 114. When, however, the corresponding non-video advertisement 128 is thereafter displayed, the user may identify the promoted movie to be of interest, and may wish to view the video advertisement 114 in full. A resumption command indicating that playback of the video advertisement 114 is to be resumed is in this example embodiment provided by a touchscreen tap or a cursor click on the non-video advertisement 128 that is displayed in replacement of the video advertisement 114.

Figure 2E:
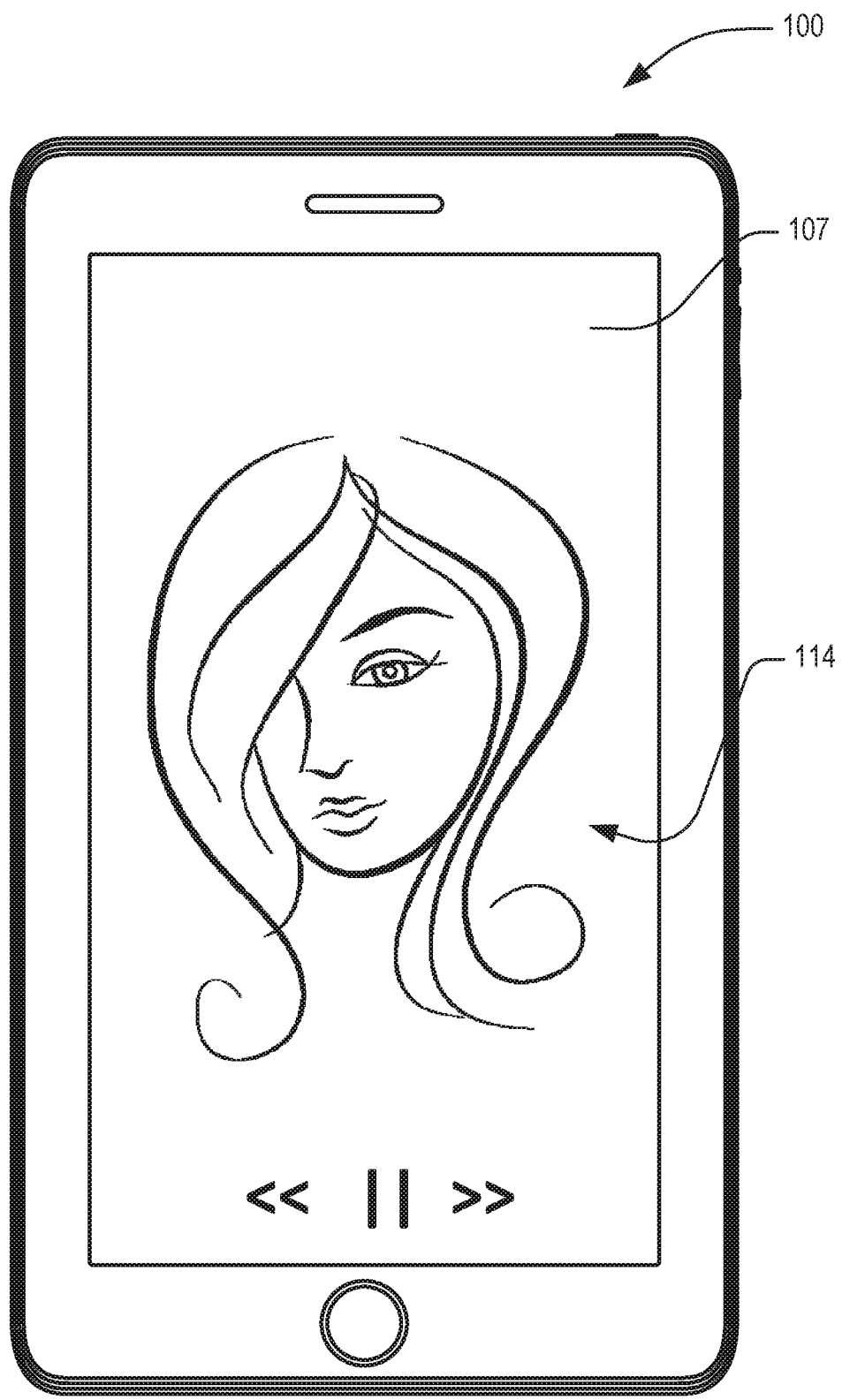

The method 501 thus includes, at operation 556, determining whether or not a further tap/click input is received during the set interval. If so (FIG. 2D), playback of the video advertisement 114 is resumed from the last viewed location (operation 581; FIG. 2E). If not, the image fades or transitions to the next media item 135 (operation 571; FIG. 2C).

In some embodiments, a threshold location or position in the video content can be predefined by an operator for a particular video advertisement or other video item to serve as a worship for automatically determining whether or not the non-video summary information is to be displayed. In such cases, dismissal of the video advertisement 114 before the threshold moment results in automatic display of the transitional summary image 128, while dismissal of the video advertisement 114 after the watershed moment results in transition to the next media item 135 without display of the summary information.

Figure 5C:
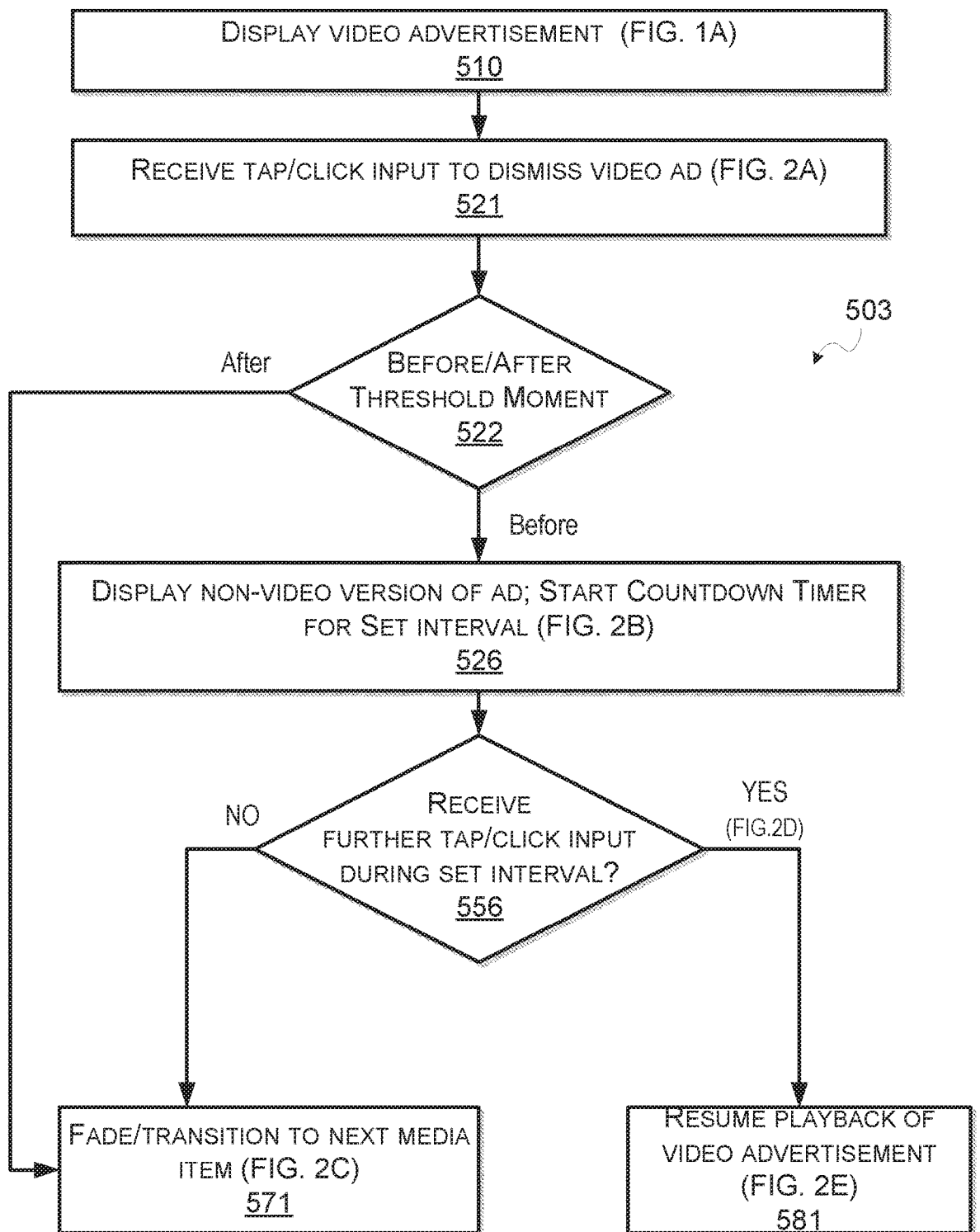
FIG. 5C is a schematic flow diagram of a video content presentation method corresponding to a further example embodiment.

One such example embodiment is illustrated in FIG. 5C, which shows a flowchart of one example method 503. The method 503 corresponds largely to the method 502 of FIG. 5B. In the method 503 of FIG. 5C, however, receipt of a dismissal command (at operation 521) immediately triggers automatic determination, at operation 522, whether or not the dismissal command was received before or after the predefined threshold moment particular to the video advertisement 114 that is to be dismissed. If the dismissal command (in this example a touchscreen tap) was indeed received before the threshold moment, then the method proceeds similarly to that described in FIG. 5B, comprising display of the substitutional non-video advertisement 128 for a set interval during which playback of the video may be resumed (at operation 581) responsive to a resumption command (at operation 556) in the example form of a further touchscreen tap.

If, however, it is determined at operation 522 that the dismissal command was received after the threshold moment, the video advertisement 114 is dismissed directly by fading or transitioning to the next media item 135 (operation 571), without displaying any intermediate summary information.

Some embodiments provide for display of one or more additional images or screens during automated transitions as described. For example, a solid color fullscreen and/or a relevant brand image may be displayed during transitions. One example provides, for example, for automated transition responsive to a dismissal input of a video advertisement first to a solid color screen associated with a particular brand, and then to the relevant summary information. In some embodiments, the solid color screen may include prominent isolated display of a relevant product brand.

Example System(s)

Figure 4:
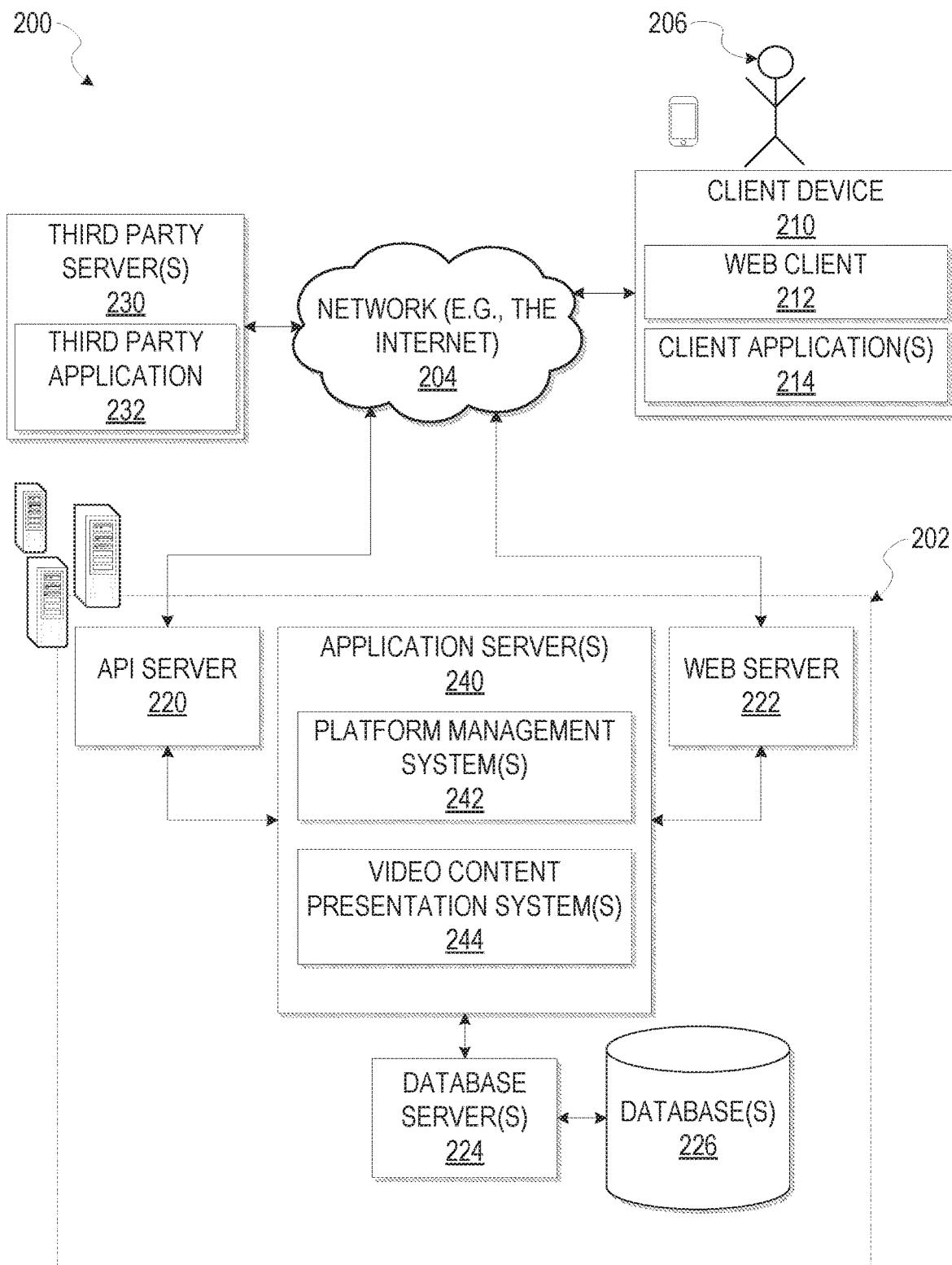
FIG. 4 is a schematic network diagram of a hardware component architecture for video content presentation systems and methods according to some example embodiments.

FIG. 4, shows an example embodiment of high-level client-server-based network architecture 200 that provides for advanced interactive video content presentation functionalities as disclosed herein. A networked system 202, in the example form of a social media platform system, provides server-side functionality via a network 204 (e.g., the Internet or wide area network (WAN)) to multiple client devices 210. For clarity of illustration, a single mobile client device 210 is shown in FIG. 4, but many similar or analogous client devices 210 are typically connected to the system 202 at any given time. It will be appreciated that non-mobile client devices 210 may subscribe to services provided by the system 202, and that dynamic media format presentation may, in some instances, be employed with respect to content delivery to such non-mobile client devices 210 (e.g., desktop computers). The system 202 is, in this example, configured to provide a social media service that includes media content-rich functionalities, such as video messaging and/or online video sharing.

The client device 210 can execute software for providing various functionalities associated with social media services and media content consumption. FIG. 4 illustrates, for example, a web client 212 (e.g., a browser, such as the Internet Explorer® browser developed by Microsoft® Corporation of Redmond, Wash. State), and an on-device client application 214 executing on client device 210.

Different types of client devices 210 on which social media functionalities are available via the system 202 may comprise, but are not limited to, mobile phones, desktop computers, laptops, portable digital assistants (PDAs), smart phones, tablets, ultra-books, netbooks, multi-processor systems, microprocessor-based or programmable consumer electronics, game consoles, set-top boxes, or any other communication device that a user may utilize to access the networked system 202. In some embodiments, the client device 210 may comprise a display module (not shown) to display information (e.g., in the form of user interfaces). In further embodiments, the client device 210 may comprise one or more of a touch screen 107, accelerometers, gyroscopes, cameras, microphones, global positioning system (GPS) devices, and so forth. The client device 210 may be a device of a user that is used to perform a transaction involving digital items within the networked system 202. In one embodiment, the networked system 202 is configured to provide a video content presentation service that responds to requests for media content from remote mobile client devices 210.

The users 206 associated with respective client devices 210 may be people, machines, or other means of interacting with client devices 210. In some embodiments, the user 206 is not part of the network architecture 200, but may interact with the network architecture 200 via client device 210 or another means. For example, one or more portions of network 204 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

Each of the client devices 210 may include one or more applications (also referred to as "apps") such as, but not limited to, a web browser, messaging application, electronic mail (email) application, and the like. The client applications 214 can, in the example embodiment of FIG. 1A-1E, include social media apps (e.g., a Snapchat™, Facebook™ or the like) video content viewing applications (e.g., Youtube™, Netflix™, or the like) that can execute on the client device 210 and cooperate with the system 202 to submit media content requests and to provide for enhanced interactive video content presentation as disclosed herein. In some embodiments, a client application 214 on the client device 210 performs the described automated operations for enhanced video content presentation as described. In other embodiments, such video content presentation enhancement are performed by a content delivery server, such as application server 240 in FIG. 4.

In one example embodiment, for example, a database 226 forming part of the system 202 has stored thereon multiple video advertisements together with respectively linked summary information files (e.g., respective non-video advertisements). In the previously described example embodiments, the video advertisement 114 and the associated non-video advertisement 128 provides one example of such a pair of linked video and non-video files.

When a user selects a particular video file to watch on the client device 210, the video content presentation system 244 automatically selects a particular autoplay video advertisement to play on a display screen of the client device 210 before playback of the selected video file commences. The selected video advertisement is then downloaded to the client device 210 together in association with a file for the linked non-video material. Thereafter, one of the methods of FIGS. 5A-5C may, for example, be performed using the downloaded video file and linked non-video file. Before the video clip selected by the user is played back, the selected video advertisement is automatically presented as a skippable video ad preceding the user-selected video clip. If the user 206 skips the video advertisement before completion (or, in some embodiments, before playback to a predefined threshold point), a transitional image in the form of the linked non-video advertisement is displayed before the selected video clip (corresponding in this instance to the next media item 135 in the embodiment of FIGS. 1A-1E) is played back on the client device 206.

In some embodiments, if the social media application or video playback application is executed on a given one of the client devices 210, then this application is configured to locally provide the user interface and at least some of the functionalities with the application configured to communicate with the networked system 202, on an as needed basis, for data and/or processing capabilities not locally available (e.g., access to a social media platform to upload and/or download media content, etc.). Conversely, if the social media application is not included in the client device 210, the client device 210 may use its web browser to access the relevant social media site (or a variant thereof) hosted on the networked system 202.

An application program interface (API) server 220 and a web server 222 are coupled to, and provide programmatic and web interfaces respectively to, one or more application servers 240. The application servers 240 may host one or more systems for providing various functionalities, for example including a social media platform management system(s) 242 and a video content presentation system 244, each of which may comprise one or more modules or applications and each of which may be embodied as permanently configured hardware, hardware, executing software to dynamically configure one or more processor devices to perform various automated operations, firmware, or any combination thereof. The application servers 240 are, in turn, shown to be coupled to one or more database servers 224 that facilitate access to one or more information storage repositories or database(s) 226. In an example embodiment, the databases 226 are storage devices that store information to be posted on the social media platform, message data, and/or media content (e.g., digital photos, videos, and audio files). The databases 226 may also store digital item information in accordance with example embodiments.

Further, while the client-server-based network architecture 200 shown in FIG. 4 employs a client-server architecture, the present disclosure is not limited to such an architecture, and could equally well find application in a distributed, or peer-to-peer, architecture system, for example. The various platform management system(s) 242 and video content presentation system(s) 244 could also be implemented as standalone software programs, which do not necessarily have networking capabilities.

The web client 212 may access the various platform management and video content presentation systems 242 and 244 via the web interface supported by the web server 222. At least some of the client application(s) 214 may comprise a programmatic client to cooperate with the system 202 to facilitate enhanced video content presentation. Additionally, a third party application 232, executing on a third party server(s) 230, is shown as having programmatic access to the networked system 202 via the programmatic interface provided by the API server 220. For example, the third party application 232, utilizing information retrieved from the networked system 202, may support one or more features or functions on a website hosted by the third party.

Figure 3:
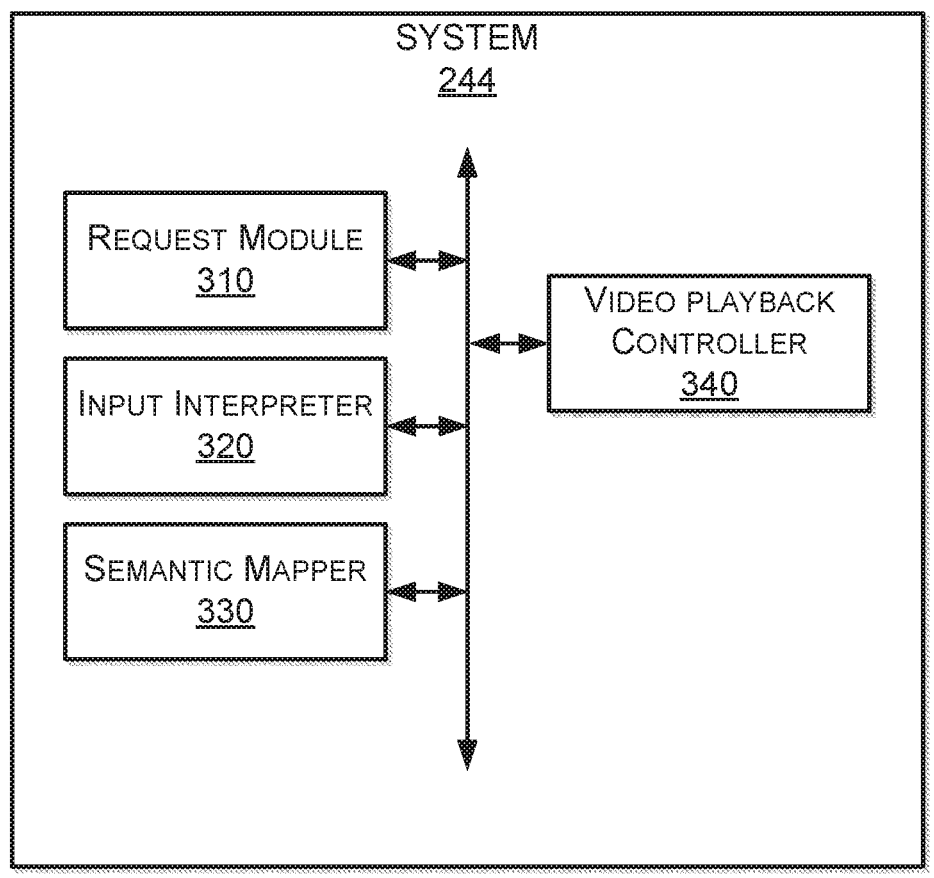
FIG. 3 is a schematic block diagram illustrating various hardware-implemented modules of a video content presentation system, according to some example embodiments.

FIG. 3 is a schematic block diagram of a video content presentation system 244, in accordance with an example embodiment. The system 244 comprises a number of different hardware-implemented modules, units, or other means configured for automated performance of associated operations, as described in greater detail elsewhere herein. The various components may, in some embodiments, be provided by permanently configured circuit arrangements, and may, in other embodiments, be provided by software executing on one or more dynamically reconfigurable processor devices, thereby to configure the processor devices sequentially, or in parallel, to provide the respective hardware-implemented modules. In some embodiments, the system 244 may be provided by server-side components, such as in the example embodiment of FIG. 4. In other embodiments, at least part of the system 244 may be provided by the mobile client device 210 executing custom software. In some embodiments, the system 244 may be provided entirely by an electronic device such as a personal computer or a mobile electronic device. In embodiments such as that described with reference to FIGS. 1A-2E, the system 244 is provided by the mobile electronic device such as the phone 100.

The system 244 includes a request module 310 configured to receive a request for delivery of media content to a mobile client device 210. In cases where the request module 310 is a server-side component, the request module 310 may be configured to receive an electronic communication originating from the relevant mobile client device 210 that indicates the particular media content which is to be delivered. In other embodiments, where request module 310 forms part of the mobile client device 210, the request module 310 may be configured to receive and interpret user input on the client device 210, and to communicate an electronic request message to the relevant video content presentation server 244.

An input interpreter 320 is provided to receive and interpret user input provide with respect to displayed video content, e.g., to identify dismissal commands and/or resumption commands during video playback, as described earlier. The system 244 further includes a semantic mapper 330 configured to map in device memory multiple transitional images or material with respective units of video content. In some example embodiments, the transitional material comprises a non-video advertisements to be displayed as a transitional image after dismissal of particular associated video advertisements. In this manner, each of multiple video advertisements 114 may be linked to a respective non-video advertisements 128. In other embodiments, the transitional material may instead, or in addition, include a solid color screen/image to be displayed in association with a respective video advertisement, a brand name and/or logo image to be displayed in association with a respective video advertisement, or the like.

The example system 244 further includes a video playback controller 340 configured to dynamically interact with the other described system components to provide the enhanced video playback functionalities described with reference to FIGS. 1A-2E and 5A-5C.

Modules, Components, and Logic

Certain embodiments are described herein as including logic or a number of components, modules, or mechanisms. Examples of such components include the request module 310, the input interpreter 320, the semantic mapper 330, and a video playback controller 340 described with reference to FIG. 3. Such components or modules may constitute either software modules (e.g., code embodied on a machine-readable medium) or hardware modules/components. A "hardware module/component is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In such cases, the various described hardware modules of a system or machine to perform the disclosed operations may not at any time have all of the modules described as forming part of the system or machine. Instead, a reconfigurable computer processor (e.g., a CPU) may, at various times, be configured by execution of specific software to form different corresponding modules.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or reconfigurable circuitry that is temporarily configured by software to perform certain operations. For example, a hardware module may include software executed by a computer processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module or component, or reference to a processor configured to perform specified operations should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. As mentioned earlier in respect to embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 204 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1A-5C are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things", while yet another combination produces a server computer for use within a cloud computing architecture. Not all combinations of such software and hardware architectures are presented here as those of skill in the art can readily understand how to implement various embodiments consistent with this disclosure in different contexts from the disclosure contained herein.

Software Architecture

Figure 6:
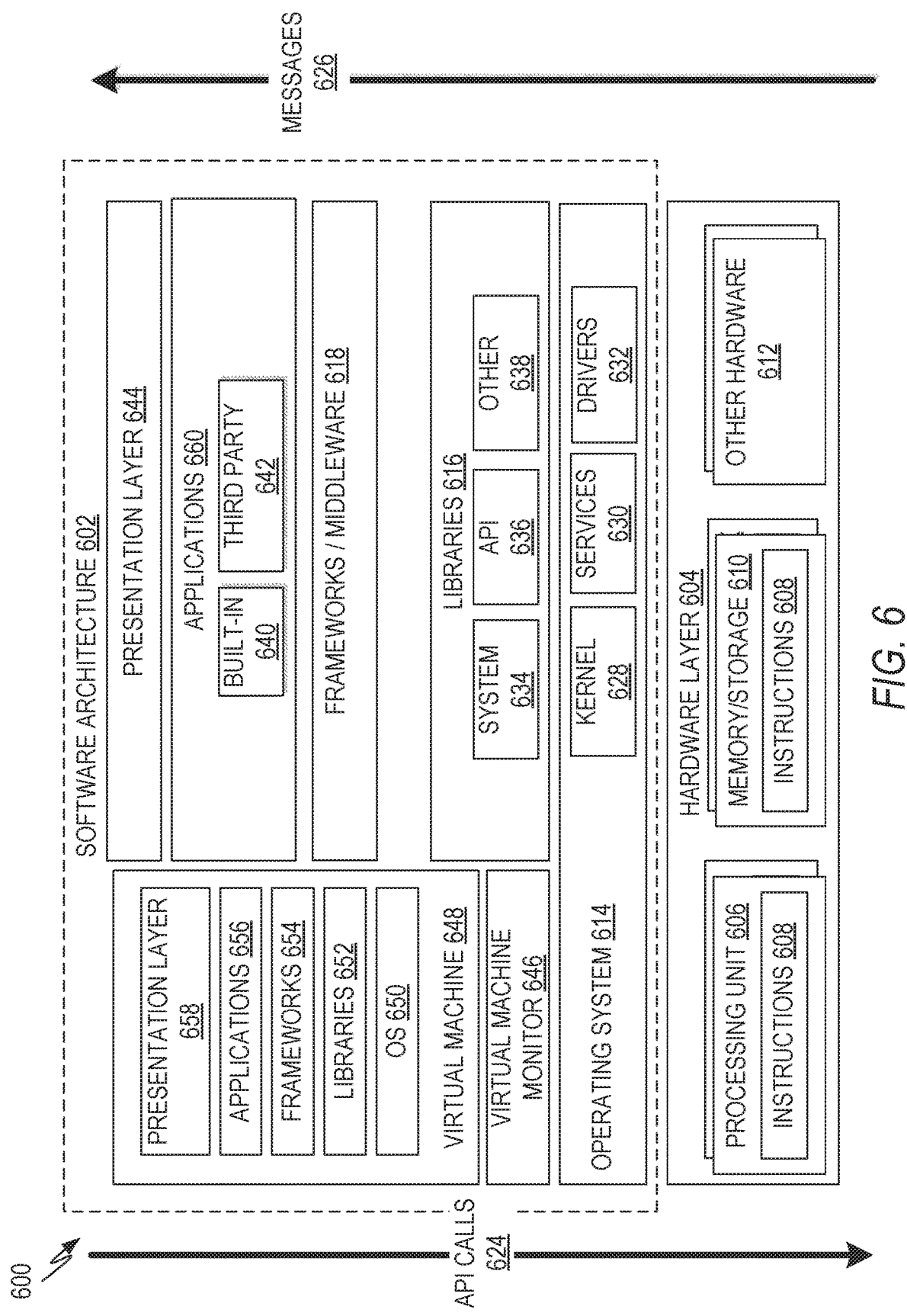
FIG. 6 is a block diagram illustrating an example of a software architecture that may be installed on a machine to provide for a specially configured system for presenting video content according to some example embodiments.

FIG. 6 is a block diagram 600 illustrating a representative software architecture 602, which may be used in conjunction with various hardware architectures herein described. FIG. 6 is merely a non-limiting example of a software architecture and it will be appreciated that many other architectures may be implemented to facilitate the functionality described herein. The software architecture 602 may be executing on hardware such as machine 700 of FIG. 7 that includes, among other things, processors 710, memory 730, and I/O components 750. A representative hardware layer 604 is illustrated and can represent, for example, the machine 700 of FIG. 7. The representative hardware layer 604 comprises one or more processing units 606 having associated executable instructions 608. Executable instructions 608 represent the executable instructions of the software architecture 602, including implementation of the methods, modules and so forth of FIGS. 1A-5C. Hardware layer 604 also includes memory and/or storage modules 610, which also have executable instructions 608. Hardware layer 604 may also comprise other hardware as indicated by 612 which represents any other hardware of the hardware layer 604, such as the other hardware illustrated as part of machine 700.

In the example architecture of FIG. 6, the software 602 may be conceptualized as a stack of layers where each layer provides particular functionality. For example, the software 602 may include layers such as an operating system 614, libraries 616, frameworks/middleware 618, applications 660 and presentation layer 644. Operationally, the applications 660 and/or other components within the layers may invoke application programming interface (API) calls 624 through the software stack and receive a response, returned values, and so forth illustrated as messages 626 in response to the API calls 624. The layers illustrated are representative in nature and not all software architectures have all layers. For example, some mobile or special purpose operating systems 614 may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 660 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 660 and other software components/modules.

The frameworks 618 (also sometimes referred to as middleware) may provide a higher-level common infrastructure that may be utilized by the applications 660 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 660 and/or other software components/modules, some of which may be specific to a particular operating system 614 or platform.

The applications 660 includes built-in applications 640 and/or third party applications 642. Examples of representative built-in applications 640 may include, but are not limited to, a contacts application, a browser application, a book reader application, a location application, a media application, a messaging application, and/or a game application. Third party applications 642 may include any of the built in applications 640 as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems 614. In this example, the third party application 642 may invoke the API calls 624 provided by the mobile operating system such as operating system 614 to facilitate functionality described herein.

The applications 660 may utilize built in operating system functions (e.g., kernel 628, services 630 and/or drivers 632), libraries 616 (e.g., system 634, APIs 636, and other libraries 638), and frameworks/middleware 618 to create user interfaces to interact with users 206 of the system 202. Alternatively, or additionally, in some systems, interactions with a user 206 may occur through a presentation layer, such as presentation layer 644. In these systems, the application/module "logic" can be separated from the aspects of the application/module that interact with a user 206.

Some software architectures utilize virtual machines. In the example of FIG. 6, this is illustrated by virtual machine 648. A virtual machine 648 creates a software environment where applications/modules can execute as if they were executing on a hardware machine (such as the machine 700 of FIG. 7, for example). A virtual machine 648 is hosted by a host operating system (operating system 614 in FIG. 6) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656 and/or presentation layer 658. These layers of software architecture executing within the virtual machine 648 can be the same as corresponding layers previously described or may be different.

Example Machine Architecture and Machine-Readable Medium

Figure 7:
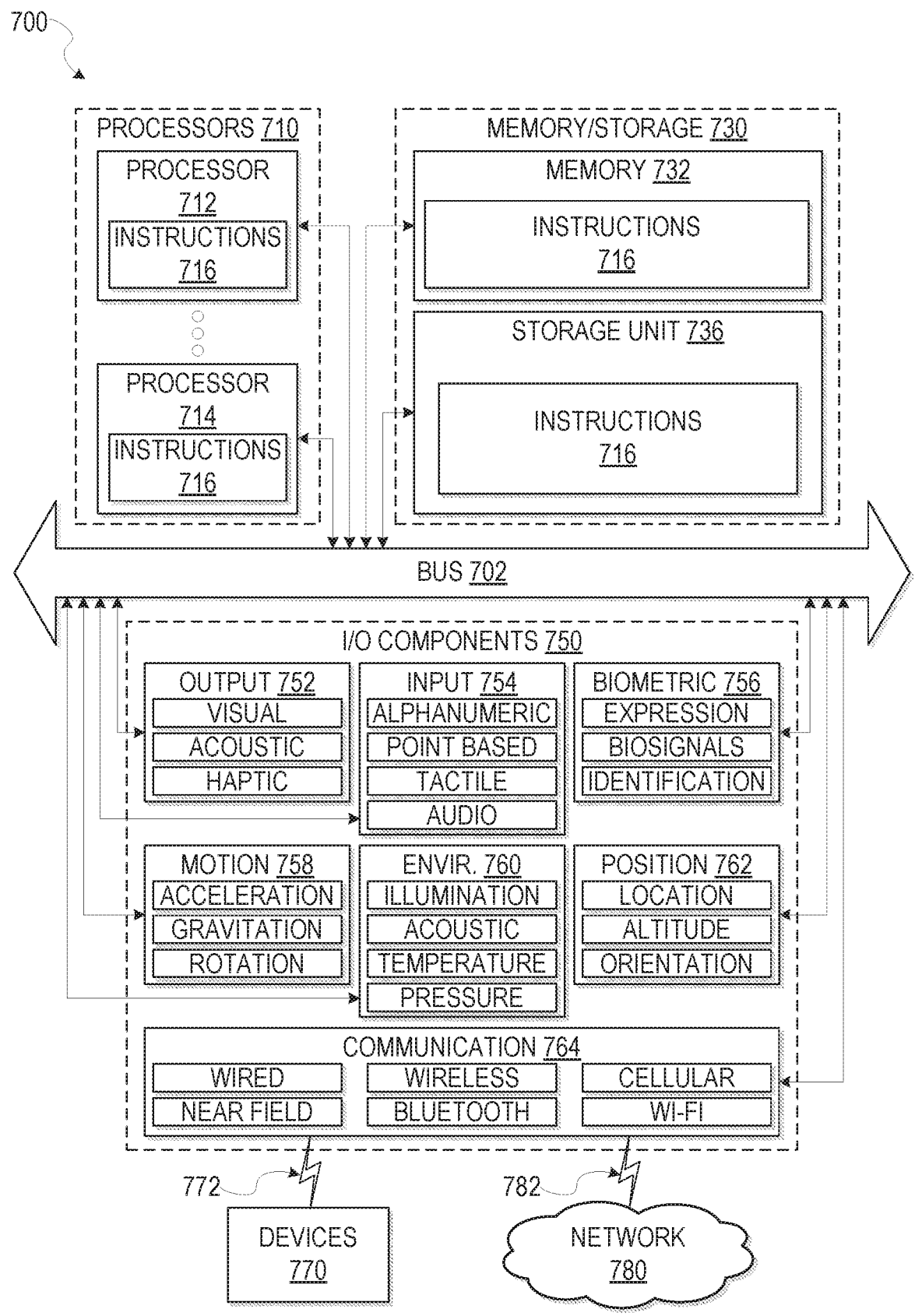
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions 608 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions 716 may cause the machine 700 to execute the flow diagrams of FIGS. 4 and 5. Additionally, or alternatively, the instructions 716 may implement the respective modules of FIG. 3 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 712 and processor 714 that may execute instructions 716. The term "processor" is intended to include a multi-core processor 710 that may comprise two or more independent processors 712, 714 (sometimes referred to as "cores") that may execute instructions 716 contemporaneously. Although FIG. 7 shows multiple processors 712, 714, the machine 700 may include a single processor 710 with a single core, a single processor 710 with multiple cores (e.g., a multi-core process), multiple processors 710 with a single core, multiple processors 710 with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716, embodying any one or more of the methodologies or functions described herein. The instructions 716 may also reside, completely or partially, within the memory 732, within the storage unit 736, within at least one of the processors 710 (e.g., within the processor 710's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions 716 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database 226, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   causing playback of video content via a display screen of an electronic user device;
   receiving, during playback of the video content, a dismissal input with respect to the video content via a user input mechanism of the user device, the dismissal input indicating a user command to dismiss playback of the video content and to automatically commence playback on the display screen of a next video item in a sequence of video items of which said video content forms part; and
   in an automated operation performed by a computer processor device in response to and conditional on the dismissal input, displaying, in replacement of the video content and before commencing display of the next video item, summary information that delivers an informational payload of the video content, wherein displaying of the summary information comprises visibly presenting text information that directly conveys the informational payload of the video content as a whole.

2. The method of claim 1, wherein the summary information displayed in replacement of the video content is non-video summary information.

3. The method of claim 2, wherein:
the video content comprises a video advertisement; and
the non-video summary information comprises a non-video advertisement, wherein the video advertisement and the non-video advertisement provide promotional information with respect to a common subject.

4. The method of claim 3, wherein the video content comprises one of entertainment material or educational material, the non-video summary information comprising bibliographic information about the video content.

5. The method of claim 4, wherein the non-video summary information comprises a title card for the video content that is to be dismissed responsive to the dismissal input.

6. The method of claim 2, wherein the dismissal input comprises a swipe gesture exerted on the video content, the method further comprising:
responsive to the swipe gesture, displaying realtime on-screen dragging with the swipe gesture of a user interface element (UI element) carrying the summary information.

7. The method of claim 6, wherein the displaying of the on-screen dragging of the UI element carrying the summary information is performed continuously substantially from commencement of the swipe gesture until the UI element is dragged to a predefined terminal position, the method further comprising:
in response to dragging of the UI element via the swipe gesture to the terminal position, dismissing the video content; and
automatically commencing playback on the display screen of said next video item in the sequence of video items of which the dismissed video content forms part.

8. The method of claim 6, further comprising:
identifying premature cessation of the swipe gesture by determining that the dragged UI element carrying the summary information is released before the UI element is dragged to a predefined terminal position; and
responsive to the premature cessation of the swipe gesture, resuming playback of the video content on the display screen in replacement of the summary information.

9. The method of claim 2, wherein the displaying of the summary information comprises:
at commencement of the displaying of the summary information, starting a timer set to expire after a fixed interval;
displaying the summary information for the duration of the fixed interval; and
upon expiry of the timer, automatically removing the summary information from the display screen, thereby to dismiss the video content for which the dismissal input was received.

10. The method of claim 9, further comprising, during display of a further video content item receiving a dismissal input with respect to the further video content item:
displaying in replacement of the further video content item associated summary information that delivers an informational payload of the further video content item;
at commencement of the displaying of the summary information for the further video content item, starting a respective timer set to expire after the fixed interval;
before expiry of the timer, receiving a resumption input; and
in response to the resumption input, resuming playback of the further video content item via the display screen.

11. A system comprising:
one or more computer processor devices; and
memory storing instructions that, when executed by the one or more computer processor devices, configure the one or more computer processor devices to perform operations comprising:
causing playback of video content via a display screen of an electronic user device;
during playback of the video content, receiving a dismissal input with respect to the video content via a user input mechanism of the user device, the dismissal input indicating a user command to dismiss playback of the video content and to automatically commence playback on the display screen of a next video item in a sequence of video items of which said video content forms part; and
in response to and conditional on the dismissal input, automatically displaying, in replacement of the video content and before commencing display of the next video item, summary information that delivers an informational payload of the video content, wherein displaying of the summary information comprises visibly presenting text information that directly conveys the informational payload of the video content as a whole.

12. The system of claim 11, wherein the summary information displayed in replacement of the video content is non-video summary information.

13. The system of claim 12, wherein:
the video content comprises a video advertisement; and
the non-video summary information comprises a non-video advertisement, wherein the video advertisement and the non-video advertisement provide promotional information with respect to a common subject.

14. The system of claim 13, wherein the video content comprises one of entertainment material or educational material, the non-video summary information comprising bibliographic information about the video content.

15. The system of claim 14, wherein the non-video summary information comprises a title card for the video content that is to be dismissed responsive to the dismissal input.

16. The system of claim 12, wherein the dismissal input comprises a swipe gesture exerted on the video content, the instructions further configure the one or more to:
responsive to the swipe gesture, displaying realtime on-screen dragging with the swipe gesture of a user interface element (UI element) carrying the summary information.

17. The system of claim 16, wherein the instructions configure the one or more computer processor devices such that the displaying of the on-screen dragging of the UI element carrying the summary information is performed continuously substantially from commencement of the swipe gesture until the UI element is dragged to a predefined terminal position, the instructions further configuring the one or more computer processor devices to:
in response to dragging of the UI element via the swipe gesture to the terminal position, dismiss the video content; and automatically commence playback on the display screen of said next video item in the sequence of video items of which the dismissed video content forms part.

18. The system of claim 16, wherein the instructions further configure the one or more computer processor devices to:
   identify premature cessation of the swipe gesture by determining that the dragged UI element carrying the summary information is released before the UI element is dragged to a predefined terminal position; and
   responsive to the premature cessation of the swipe gesture, resume playback of the video content on the display screen in replacement of the summary information.

19. The system of claim 12, wherein the instructions configure the one or more computer processor devices such that the displaying of the summary information comprises:
   at commencement of the displaying of the summary information, starting a timer set to expire after a fixed interval;
   displaying the summary information for the duration of the fixed interval;
   responsive to and conditional upon receiving a resumption input during display of the summary information, before expiry of the timer, resume playback of the further video content item via the display screen; and
   in the absence of a resumption input during the fixed interval, automatically removing the summary information from the display screen upon expiry of the timer, thereby to dismiss the video content for which the dismissal input was received.

20. A non-transitory computer-readable storage medium having stored thereon instructions that, when executed by a computer, cause the computer to perform operations comprising:
   causing playback of video content via a display screen of an electronic user device;
   receiving, during playback of the video content, a dismissal input with respect to the video content via a user input mechanism of the user device, the dismissal input indicating a user command to dismiss playback of the video content and to automatically commence playback on the display screen of a next video item in a sequence of video items of which said video content forms part; and
   in an automated operation performed in response to and conditional on the dismissal input, displaying, in replacement of the video content and before commencing display of the next video item, summary information that delivers an informational payload of the video content, wherein displaying of the summary information comprises visibly presenting text information that directly conveys the informational payload of the video content as a whole.

* * * * *